United States Patent
Curtis et al.

(10) Patent No.: US 7,734,092 B2
(45) Date of Patent: Jun. 8, 2010

(54) MULTIPLE IMAGE INPUT FOR OPTICAL CHARACTER RECOGNITION PROCESSING SYSTEMS AND METHODS

(75) Inventors: Donald B. Curtis, Highland, UT (US); Shawn Reid, Orem, UT (US)

(73) Assignee: Ancestry.com Operations Inc., Provo, UT (US)

( * ) Notice: Subject to any disclaimer, the term of this patent is extended or adjusted under 35 U.S.C. 154(b) by 380 days.

(21) Appl. No.: 11/560,026

(22) Filed: Nov. 15, 2006

(65) Prior Publication Data

US 2007/0211942 A1 Sep. 13, 2007

Related U.S. Application Data

(60) Provisional application No. 60/780,484, filed on Mar. 7, 2006.

(51) Int. Cl.
G06K 9/18 (2006.01)
G06K 9/34 (2006.01)
G06K 9/20 (2006.01)
H04N 1/40 (2006.01)

(52) U.S. Cl. .......... 382/182; 382/177; 382/176; 382/317; 382/321; 358/462

(58) Field of Classification Search ......... 382/173–178, 382/182; 358/462
See application file for complete search history.

(56) References Cited

U.S. PATENT DOCUMENTS

| | | | |
|---|---|---|---|
| 5,519,786 A * | 5/1996 | Courtney et al. ............ 382/159 |
| 5,617,484 A * | 4/1997 | Wada et al. ................. 382/172 |
| 5,809,167 A * | 9/1998 | Al-Hussein ................. 382/190 |
| 5,920,655 A * | 7/1999 | Makita et al. ............... 382/272 |
| 6,269,188 B1 * | 7/2001 | Jamali ......................... 382/229 |
| 6,304,313 B1 * | 10/2001 | Honma ......................... 355/18 |
| 6,330,003 B1 * | 12/2001 | Curtis et al. ................ 345/648 |
| 6,351,566 B1 * | 2/2002 | Zlotnick ..................... 382/237 |
| 6,438,265 B1 * | 8/2002 | Heilper et al. .............. 382/172 |
| 6,571,013 B1 * | 5/2003 | Macey et al. ................ 382/181 |

(Continued)

OTHER PUBLICATIONS

Definition—"Image Binarization"; www.haifa.ibm.com, pp. 1 of 1.*

(Continued)

*Primary Examiner*—Bhavesh M Mehta
*Assistant Examiner*—Mia M Thomas
(74) *Attorney, Agent, or Firm*—Townsend and Townsend and Crew LLP

(57) ABSTRACT

A method of processing an image includes receiving a digital version of the image, processing the digital version of the image through at least two binarization processes to thereby create a first binarization and a second binarization, and processing the first binarization through a first optical character recognition process to thereby create a first OCR output file. Processing the first binarization through a first optical character recognition process includes compiling first metrics associated with the first OCR output file. The method also includes processing the second binarization through the first optical character recognition process to thereby create a second OCR output file. Processing the second binarization through the first optical character recognition process includes compiling second metrics associated with the second OCR output file. The method also includes using the metrics, at least in part, to select a final OCR output file from among the OCR output files.

12 Claims, 3 Drawing Sheets

U.S. PATENT DOCUMENTS

| | | | |
|---|---|---|---|
| 6,577,762 B1* | 6/2003 | Seeger et al. | 382/173 |
| 6,738,496 B1* | 5/2004 | Van Hall | 382/101 |
| 6,741,351 B2* | 5/2004 | Marshall et al. | 356/406 |
| 6,741,745 B2* | 5/2004 | Dance et al. | 382/229 |
| 6,868,524 B1* | 3/2005 | Fushiki et al. | 715/205 |
| 6,922,487 B2* | 7/2005 | Dance et al. | 382/190 |
| 6,947,574 B1* | 9/2005 | Graulich et al. | 382/101 |
| 7,236,632 B2* | 6/2007 | Erol et al. | 382/218 |
| 7,339,992 B2* | 3/2008 | Chang et al. | 375/240.25 |
| 7,403,656 B2* | 7/2008 | Koga | 382/177 |
| 2001/0041005 A1* | 11/2001 | Fujiwara | 382/181 |
| 2002/0008715 A1* | 1/2002 | Sorek et al. | 345/698 |
| 2002/0015167 A1* | 2/2002 | Watanabe et al. | 358/1.11 |
| 2002/0015524 A1* | 2/2002 | Fujiwara | 382/181 |
| 2002/0021840 A1* | 2/2002 | Ohara et al. | 382/199 |
| 2002/0057838 A1* | 5/2002 | Steger | 382/197 |
| 2002/0067581 A1* | 6/2002 | Hiramoto et al. | 360/322 |
| 2002/0067851 A1* | 6/2002 | Lange et al. | 382/181 |
| 2002/0154134 A1* | 10/2002 | Matsui | 345/582 |
| 2003/0012440 A1* | 1/2003 | Nakanishi et al. | 382/101 |
| 2003/0113016 A1* | 6/2003 | Naoi et al. | 382/181 |
| 2004/0146200 A1* | 7/2004 | Andel et al. | 382/177 |
| 2005/0024679 A1* | 2/2005 | Yoda et al. | 358/1.15 |
| 2005/0031208 A1* | 2/2005 | Ohara et al. | 382/202 |
| 2005/0138555 A1* | 6/2005 | Fushiki et al. | 715/531 |
| 2005/0180632 A1* | 8/2005 | Aradhye et al. | 382/182 |
| 2005/0271294 A1* | 12/2005 | Takahashi | 382/272 |
| 2006/0039605 A1* | 2/2006 | Koga | 382/182 |
| 2007/0019881 A1* | 1/2007 | Curtis | 382/274 |
| 2007/0047816 A1* | 3/2007 | Graham et al. | 382/181 |
| 2007/0201757 A1* | 8/2007 | Madej et al. | 382/254 |
| 2007/0269139 A1* | 11/2007 | Erol et al. | 382/305 |
| 2008/0008383 A1* | 1/2008 | Andel et al. | 382/173 |
| 2008/0063279 A1* | 3/2008 | Vincent et al. | 382/182 |
| 2008/0170785 A1* | 7/2008 | Simmons et al. | 382/176 |

OTHER PUBLICATIONS

Merriam-Webster Online Dictionary-define metrics.*

Gupta et al. OCR Binarization and image pre-processing for searching historical documents—Science Direct Pattern Recognition 20 (2007) 389-397.*

Khashman et al Global Binarization of Document Images Using Neural Network—pp. 619-626 (1-8).*

Thillou et al Segmentation Based Binarization for Color Degraded Images—Computer Vision and Graphics 2006 pp. 808-813.*

* cited by examiner

MULTIPLE IMAGE INPUT FOR OPTICAL CHARACTER RECOGNITION PROCESSING SYSTEMS AND METHODS

CROSS-REFERENCES TO RELATED APPLICATIONS

This application is a non-provisional of U.S. Patent Application No. 60/780,484, filed on Mar. 7, 2006, and incorporates by reference U.S. patent application Ser. No. 11/188,137, entitled "ADAPTIVE CONTRAST CONTROL SYSTEMS AND METHODS," filed on Jul. 21, 2005, by Curtis.

Embodiments of the present invention relate generally to image processing. More specifically, embodiments of the present invention relate to systems and methods for performing Optical Character Recognition on source images.

BACKGROUND OF THE INVENTION

Optical Character Recognition (OCR) engines are widely available. OCR engines differ in their approach to the problem of recognizing characters. Some entities who process documents using OCR have taken the approach of running multiple OCR engines on a single digital image and then using a technique such as voting to determine which text to actually output from the various engines. The idea behind this approach is to use the best of each OCR engine to obtain the over-all highest-quality text output. Nevertheless, this approach is not optimal and improvements are desired.

BRIEF SUMMARY OF THE INVENTION

Embodiments of the invention provide a method of processing an image. The method includes receiving a digital version of the image, processing the digital version of the image through at least two binarization processes to thereby create a first binarization and a second binarization, and processing the first binarization through a first optical character recognition process to thereby create a first OCR output file. Processing the first binarization through a first optical character recognition process includes compiling first metrics associated with the first OCR output file. The method also includes processing the second binarization through the first optical character recognition process to thereby create a second OCR output file. Processing the second binarization through the first optical character recognition process includes compiling second metrics associated with the second OCR output file. The method also includes using the metrics, at least in part, to select a final OCR output file from among the OCR output files.

In some embodiments, the method includes processing the first binarization through a second optical character recognition process to thereby create a third OCR output file. Processing the first binarization through a second optical character recognition process may include compiling third metrics associated with the third OCR output file. The method also may include processing the second binarization through the second optical character recognition process to thereby create a fourth OCR output file. Processing the second binarization through the second optical character recognition process may include compiling fourth metrics associated with the fourth OCR output file. The binarization processes may include clustering, global-thresholding, adaptive thresholding, and/or the like. The first and second optical character recognition processes may be the same optical character recognition process. The first and second optical character recognition processes may be different optical character recognition process. The metrics associated with a particular output file may include a number of characters recognized in the particular output file; a number of dictionary words in the particular output file; a number of unknown words in the particular output file; a per-character confidence level in the particular output file; a per-word confidence level in the particular output file; a per-image confidence level in the particular output file; a degree of agreement between the particular output file and other output files; which binarization and OCR process produced the particular output file; a measure of historical accuracy associated with the particular binarization/OCR combination that produced the particular output file. The method also may include creating the digital version of the image from a physical version of the image.

Other embodiments provide a method of optically recognizing characters in an image. The method includes creating multiple binarizations of the image using different binarization techniques, presenting each binarization to an optical character recognition (OCR) engine to produce OCR output file for each binarization, developing metrics relating to each OCR output file, and using the metrics, at least in part, to select a final OCR output file from among the OCR output files. The different binarization techniques may include clustering, global-thresholding, adaptive thresholding, and/or the like. Presenting each binarization to an OCR engine may include presenting each binarization to a different OCR engine. The metrics may include a number of characters recognized in the particular OCR output file; a number of dictionary words in the particular OCR output file; a number of unknown words in the particular OCR output file; a per-character confidence level in the particular output file; a per-word confidence level in the particular output file; a per-image confidence level in the particular output file; a degree of agreement between the particular OCR output file and other OCR output files; which binarization and OCR process produced the particular OCR output file; a measure of historical accuracy associated with the particular binarization/OCR combination that produced the particular OCR output file; and/or the like.

Still other embodiments provide an optical character recognition system. The system includes at least two binarization processes configured to convert grayscale images to bitonal images, at least one optical character recognition process configured to process bitonal images into final output files having characters therein, a metrics generation process configured to analyze output files and produce metrics associated therewith, a voting process configured to select a final output file from among the output files based on the metrics, a storage arrangement configured to store final output files and serve the information therein to users, and at least one processor programmed to execute the at least one optical character recognition processes, the at least one optical character recognition process, metrics generation process, and the voting process. The at least two binarization processes may include clustering, global-thresholding, adaptive thresholding, and/or the like. The metrics associated with a particular output file may include a number of characters recognized in the particular output file; a number of dictionary words in the particular output file; a number of unknown words in the particular output file; a per-character confidence level in the particular output file; a per-word confidence level in the particular output file; a per-image confidence level in the particular output file; a degree of agreement between the particular output file and other output files; which binarization and OCR process produced the particular output file; a measure of historical accuracy associated with the particular binarization/OCR combination that produced the particular output file; and/or the like.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1A:
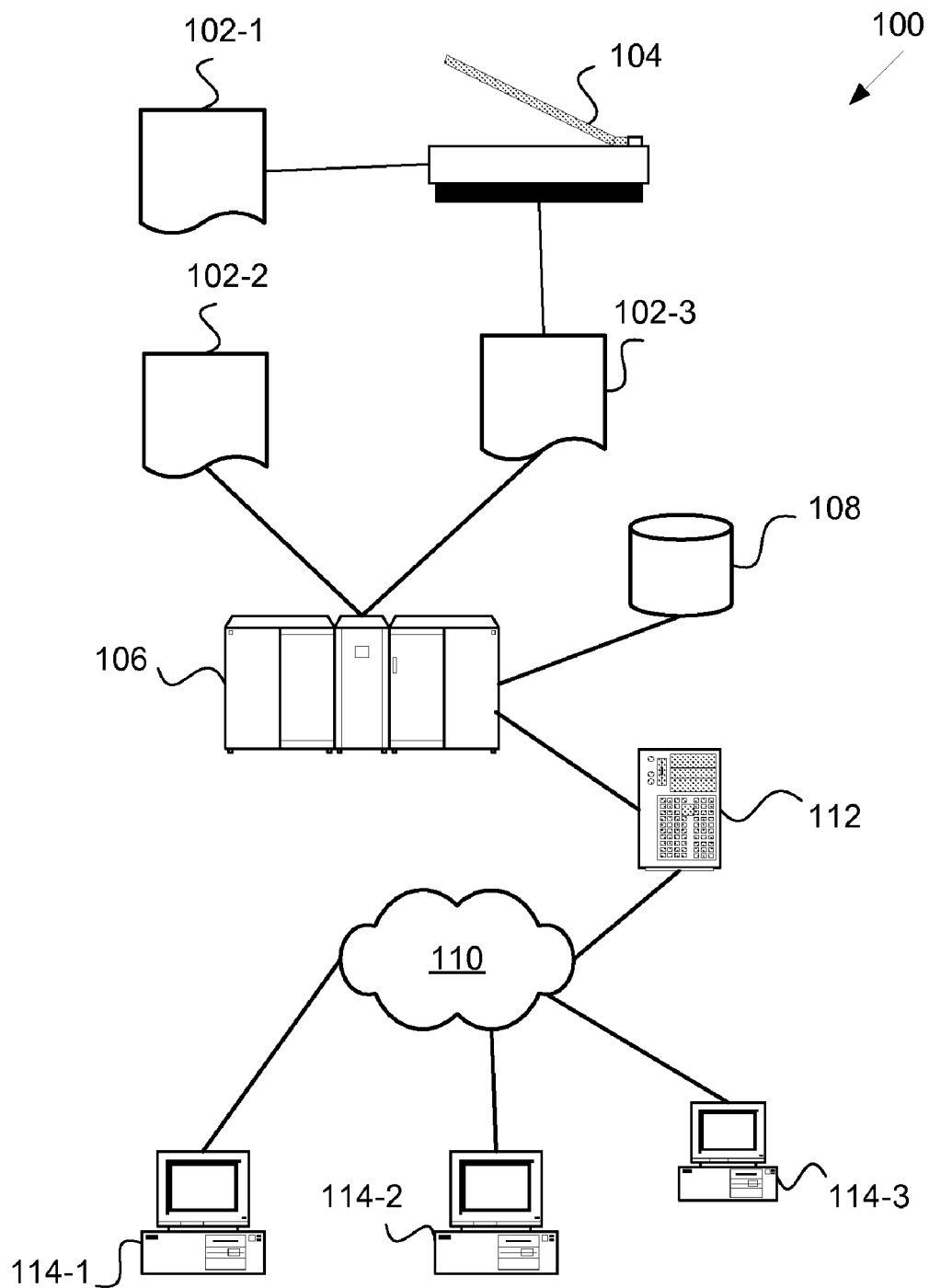
FIG. 1A depicts an exemplary Optical Character Recognition (OCR) system according to embodiments of the invention.

The present invention relates to systems and methods for improving the quality of document processing using Optical Character Recognition (OCR). The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Most OCR technologies today operate on bitonal (black-and-white) digital images. Source images, however, typically begin as grayscale or color images. A process called binarization converts a grayscale or color image to a bitonal one. Many techniques have been developed for binarizing images, including global-thresholding, adaptive thresholding, clustering, and so on. In the area of thresholding, many techniques have been developed for choosing an appropriate threshold, at least one of which is described more fully in previously-incorporated U.S. patent application Ser. No. 11/188,137. The binarization process is not an exact science and different techniques yield different results for different types of images.

Using OCR errors as a quality measure, differences in OCR errors from different binarizations of the same image can be significant. Moreover, different binarizers yield the best results for different types of documents. Hence, rather than provide a single image to the set of OCR engines (whose output will then be voted on), the quality of OCR output is maximized by presenting several incarnations of a single image to a set of one or more OCR engines. Each incarnation may be the result of different scanning techniques, (e.g. scanning with different light settings, with different resolution settings, etc.), different image processing techniques (e.g. brightening, contrast adjusting, sharpening, deskewing, resampling, etc.) or other image-modification processes, and/or different binarization algorithms. The OCR engines then process each incarnation (each input image), annotating the outputs with its metrics (e.g. confidence metrics). The outputs are voted on, using the metrics collected about the images, the OCR engines, and the confidence levels, to determine which outputs to actually send as the final result. New voting algorithms are not required, although data about each input image, the processes applied to it and their associated confidence levels could become integrated into the metrics that are used in the voting process.

Having described embodiments of the present invention generally, attention is directed to FIG. 1A, which illustrates an exemplary OCR production system 100 according to embodiments of the invention. Those skilled in the art will appreciate that the system 100 is merely exemplary of a number of possible embodiments. The system 100 operates on source images 102, which may be color or grayscale. Source images also may be physical 102-1 or digital 102-2. Physical images 102-1 are processed through a hardware scanner 104, or other appropriate process, to thereby produce a digital image 102-3 for further processing. Further processing typically takes place digitally.

The electronic images 102-2, 102-3 are then passed to a computing device 106, which may be a mainframe or other appropriate computing device, having a storage system 108 associated therewith. The images are then processed through a binarization and OCR process as will be described more fully with reference to FIG. 1B.

The final image or information thereafter may be made available via a network 110, such as the Internet. The images or information may be, for example, hosted by a web server 112 and made available to subscribers who access the images or information via subscriber computers 114.

Figure 1B:
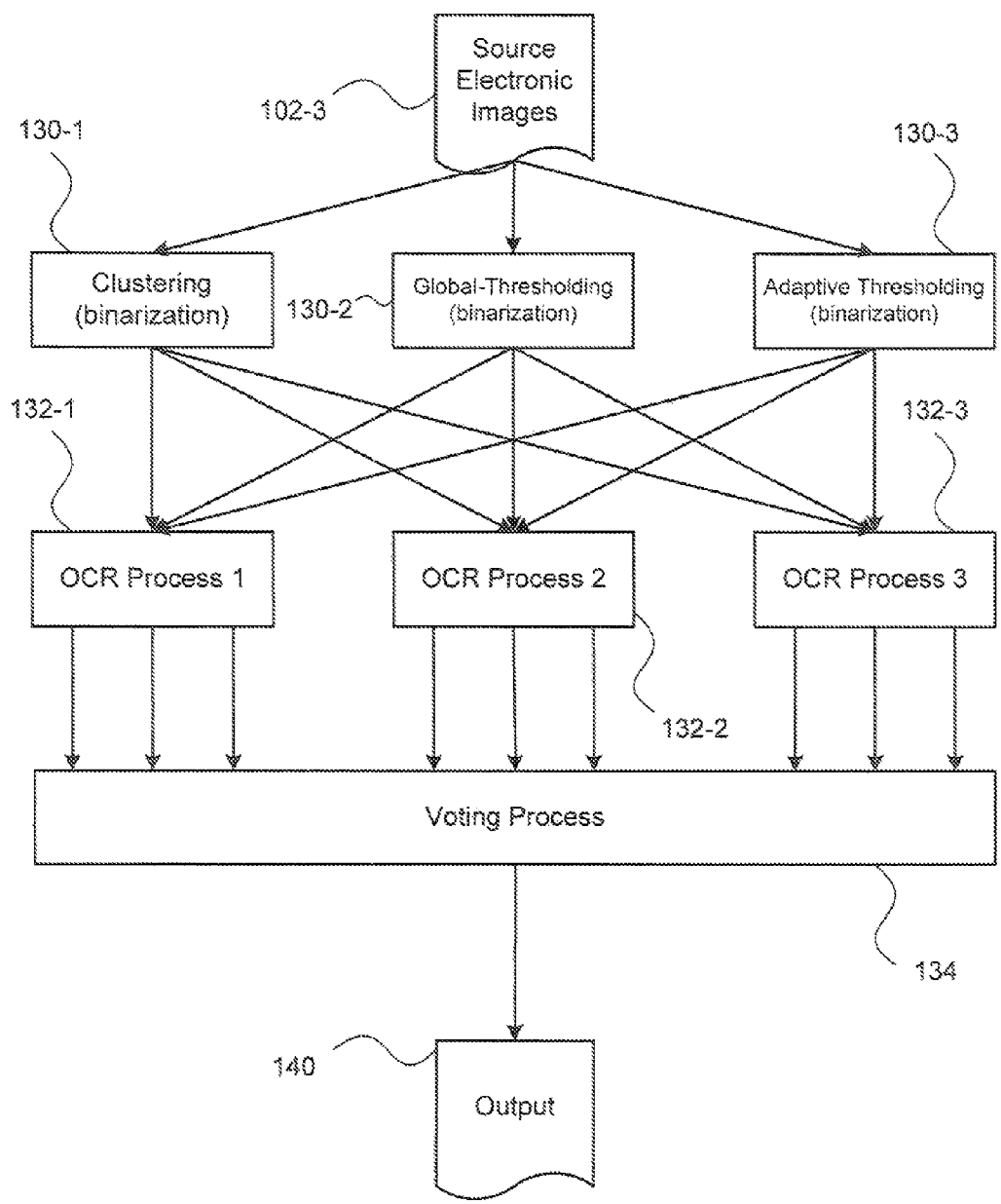
FIG. 1B depicts a block diagram of an exemplary Binarization/OCR process according to embodiments of the invention, which process may be implemented in the system of FIG. 1.

FIG. 1B depicts a block diagram of an exemplary binarization/OCR process. Source electronic images 102-3 are first subjected to at least two binarizations 130. Any suitable binarization method may be used. In this example, clustering 130-1, global-thresholding 130-2, and adaptive thresholding 130-3 are used. Additionally, a single binarization method (such as global thresholding) may provide more than one binarization by using more than one value for an input parameter (e.g. the global threshold value).

Each binarization produces a bitonal image that is then passed to one or more OCR processes 132. Any suitable OCR process may be used. In this example, each of the three bitonal images is subjected to three different OCR processes, thereby producing nine OCR output files.

During the binarization/OCR process, metrics are maintained on the intermediate and final results. Metrics may include, for example the number of characters recognized in an image, the number of dictionary words recognized, the number of unknown words, degree of agreement among different output files, which binarization and OCR process produced the output file, historical accuracy of the particular binarization or binarization/OCR combination, per-character and per-image confidence ratings, and the like.

The OCR output files are then passed to a voting process. The voting process selects a particular set of characters from any one or more available output files to be the final output. The image or information associated with the selected output file is thereafter stored for future use.

Figure 2:
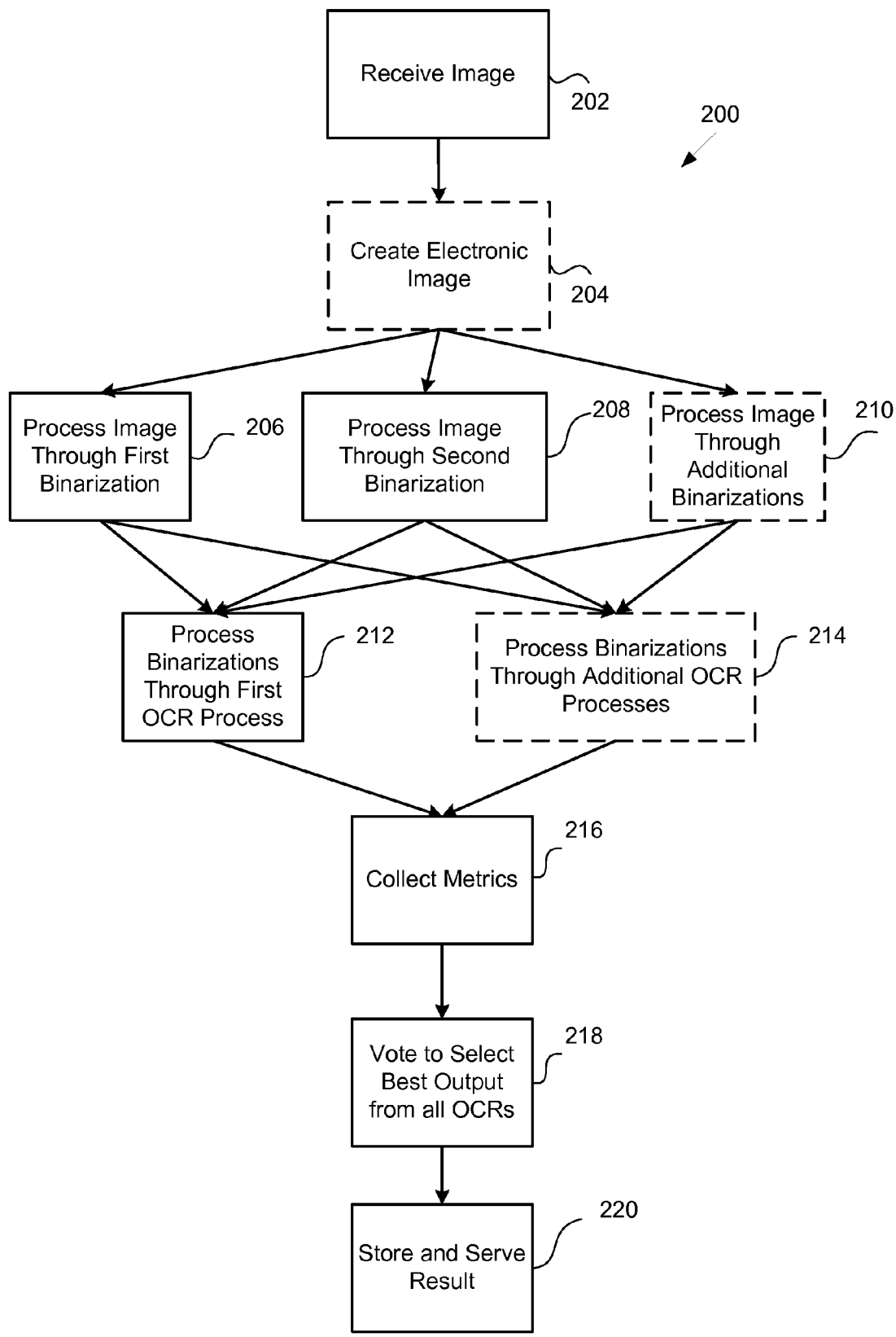
FIG. 2 depicts an exemplary OCR process according to embodiments of the invention which process may be implemented in the system of FIG. 1.

Attention is now directed to FIG. 2, which illustrates an exemplary OCR production process 200 according to embodiments of the invention. The process may be implemented in the system 100 of FIG. 1A or other appropriate system. Those skilled in the art will appreciate that the process 200 is merely exemplary of a number of possible processes, which may include more, fewer, or different steps than those illustrated and described herein. Moreover, the steps illustrated and described herein may be traversed in different steps than those shown here.

The process 200 begins at block 202, at which point an image is received for processing. The image may be physical or digital, color or black-and-white, etc. The image may be bitonal, although the advantages of the present invention are particularly evident with respect to grayscale images.

At block 204, physical images are scanned or otherwise processed to produce electronic images. Electronic images are thereafter passed to at least two binarizations 206, 208. In some cases, the electronic images are processed through additional binarizations 210. Acceptable binarizations include clustering, global-thresholding, and adaptive thresholding. The binarizations produce bitonal images.

Bitonal images produced by the binarizations are thereafter processed through at least one OCR process 212. In some examples, the bitonal images are processed through additional OCR processes 214. The OCR processes produce output files.

At block 216, the output files are analyzed, and metrics are collected related to them. Metrics may include any of a number of quality measures, including number of recognized characters, number of recognized words, ratio of recognized words:unrecognized words, and the like. At block 218 a voting process selects a set of characters for the final output file from among the output files. The results are thereafter stored and made available at block 220.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention, which is defined in the following claims.

What is claimed is:

1. A computer-readable medium having computer-executable instructions stored thereon for performing the computer-implementable method, the method comprising: receiving a digital version of an image; processing the digital version of the image through at least two binarization processes to thereby create a first binarization and a second binarization; processing the first binarization through a first optical character recognition process to thereby create a first OCR output file, wherein processing the first binarization through a first optical character recognition process comprises compiling first metrics associated with the first OCR output file; processing the second binarization through the first optical character recognition process to thereby create a second OCR output file, wherein processing the second binarization through the first optical character recognition process comprises: compiling second metrics associated with the second OCR output file; and using the first metrics and the second metrics, at least in part, to select a final OCR output file from among the OCR output files; further comprising: processing the first binarization through a second optical character recognition process to thereby create a third OCR output file, wherein processing the first binarization through a second optical character recognition process comprises compiling third metrics associated with the third OCR output file; and processing the second binarization through the second optical character recognition process to thereby create a fourth OCR output file, wherein processing the second binarization through the second optical character recognition process comprises compiling fourth metrics associated with the fourth OCR output file.

2. The computer-implementable method of claim 1, wherein the binarization processes are selected from a group consisting of: clustering; global-thresholding; and adaptive thresholding.

3. The computer-implementable method of claim 1, wherein the first and second optical character recognition processes comprise the same optical character recognition process.

4. The computer-implementable method of claim 1, wherein the first and second optical character recognition processes comprise different optical character recognition process.

5. The method of claim 1, wherein the first metrics and the second metrics comprise one or more selections from a group consisting of: a number of characters recognized in the particular output file; a number of dictionary words in the particular output file; a number of unknown words in the particular output file; a per-character confidence level in the particular output file; a per-word confidence level in the particular output file; a per-image confidence level in the particular output file; a degree of agreement between the particular output file and other output files; which binarization and OCR process produced the particular output file; and a measure of historical accuracy associated with the particular binarization or OCR process combination that produced the particular output file.

6. The computer-implementable method of claim 1, further comprising creating the digital version of the image from a physical version of the image.

7. A method of optically recognizing characters in an image, comprising: providing a computer system, wherein the computer system includes a computer readable medium, the computer readable medium having stored instructions for: creating multiple binarizations of the image using different binarization techniques; presenting each of the multiple binarizations to multiple optical character recognition (OCR) engines to produce multiple OCR output files for each binarization; developing metrics relating to each OCR output file; and using the metrics, at least in part, to select a final OCR output file from among the OCR output files; wherein presenting each binarization to an OCR engine comprises presenting each binarization to a different OCR engine.

8. The method of claim 7, wherein the different binarization techniques comprise one or more selections from a group consisting of: clustering; global-thresholding; and adaptive thresholding.

9. The method of claim 7, wherein the metrics relating to a particular OCR output file comprise one or more selections from a group consisting of: a number of characters recognized in the particular OCR output file; a number of dictionary words in the particular OCR output file; a number of unknown words in the particular OCR output file; a per-character confidence level in the particular output file; a per-word confidence level in the particular output file; a per-image confidence level in the particular output file; a degree of agreement between the particular OCR output file and other OCR output files; which binarization and OCR process produced the: particular OCR output file; and a measure of historical accuracy associated with the particular binarization or OCR combination that produced the particular OCR output file.

10. An optical character recognition system, comprising: at least two binarization processes configured to convert a grayscale image to bitonal images; at least two different optical character recognition processes configured to process at least, two bitonal images derived from—the grayscale image into final output files having characters therein; wherein presenting each binarization to an OCR engine comprises presenting each binarization to a different OCR engine; further comprising a metrics generation process configured to analyze output files and produce metrics associated therewith; a voting process configured to select a final output file from among the output files based on the metrics; a storage arrangement configured to store final output files and serve the information therein to users and at least one processor programmed to execute the at least one optical character recognition processes, the at least one optical character recognition process, metrics generation process, and the voting process.

11. The optical character recognition system of claim 10, wherein the at least two binarization processes comprise at least one selection from a group consisting of: clustering; global-thresholding; and adaptive thresholding.

12. The optical character recognition system of claim 10, wherein the metrics-associated with a particular output file comprise one or more selections from a group consisting of: a number of characters recognized in the particular output file; a number of dictionary words in the particular output file; a number of unknown words in the particular output file; a per-character confidence level in the particular output, file; a per-word confidence level in the particular output file; a per-image confidence level in the particular output file; a degree of agreement between the particular output file and other output files; which binarization and OCR process produced the particular output file; and a measure of historical accuracy associated with the particular binarization or OCR combination that produced the particular output file.

* * * * *